United States Patent
Clark et al.

[15] 3,640,359
[45] Feb. 8, 1972

[54] CONTROL SYSTEM FOR HYDRODYNAMIC RETARDER

[72] Inventors: Richard B. Clark, Washington; Hugh C. Morris, Peoria; Gerald E. Whitehurst, East Peoria, all of Ill.

[73] Assignee: Caterpillar Tractor Co., Peoria, Ill.

[22] Filed: Jan. 20, 1970

[21] Appl. No.: 4,338

[52] U.S. Cl. ............................192/3 R, 192/4 B, 188/274, 188/296, 184/6.4, 137/115
[51] Int. Cl. ....................................B60k 29/02, F16d 57/00
[58] Field of Search ........................192/3, 4 B; 188/90, 90 A

[56] References Cited

UNITED STATES PATENTS

| | | | |
|---|---|---|---|
| 2,946,416 | 7/1960 | Snoy | 192/4 B |
| 3,283,859 | 11/1966 | Bertram | 188/90 |
| 3,386,540 | 6/1968 | Horsch | 192/4 B X |
| 3,526,304 | 9/1970 | Pearce et al. | 188/90 X |

*Primary Examiner*—Benjamin W. Wyche
*Attorney*—Fryer, Tjensvold, Feix, Phillips & Lempio

[57] ABSTRACT

A control system is provided for use with a hydrodynamic retarder for providing braking to a vehicle by using engine lubricant as the working fluid. The system comprises a first pressure responsive, priority valve which functions to direct engine lubricant to a second, control valve from the engine lubricant pump only after the pressure in the engine lubricant system has achieved a sufficiently high level to supply the engine's requirements. In another embodiment, the first valve meters lubricant to both the engine and retarder at the same time by means of metering slots. The second control valve is operator-actuated and functions to direct lubricant through the heat exchanger, the lubricant filter, and then to the engine in one mode, or additionally by way of a hydrodynamic retarder in a second mode and thus to provide braking for the vehicle.

11 Claims, 2 Drawing Figures

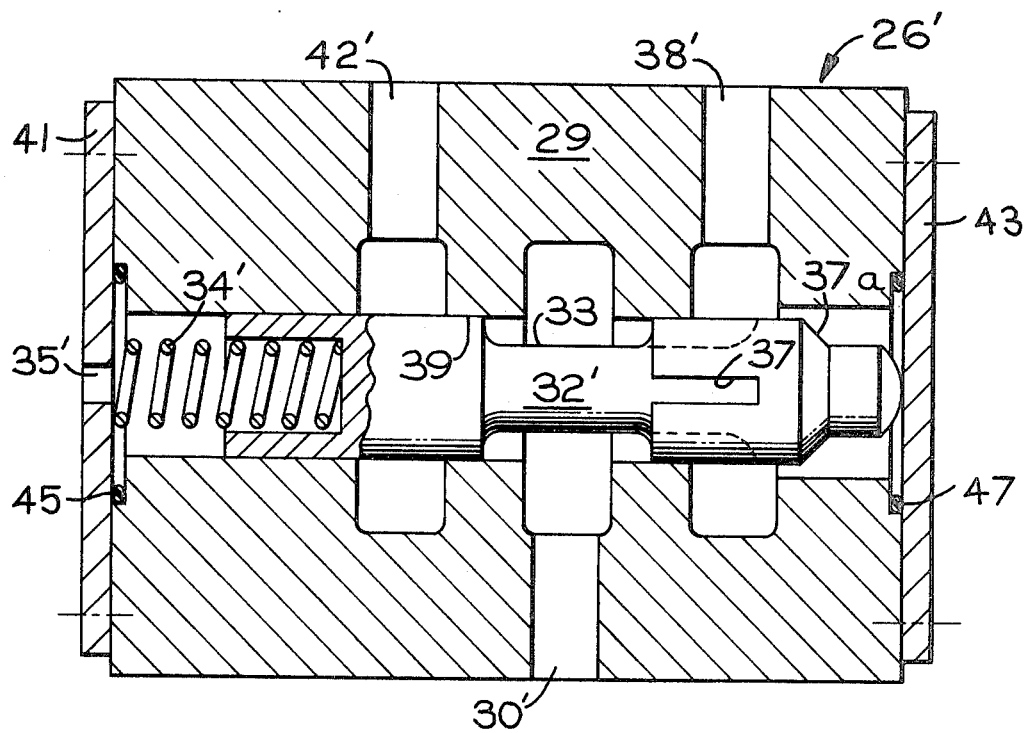

CONTROL SYSTEM FOR HYDRODYNAMIC RETARDER

Hydrodynamic retarders are used on many large vehicles to supplement the vehicle service brakes when such service brakes are insufficient in and of themselves for braking the vehicle. Large earth-moving vehicles, for example, oftentimes require such supplemental braking to decrease the vehicle's speed during operation.

Conventional retarders are arranged downstream of the engine and oftentimes downstream of the vehicle's transmission and are actuated selectively by suitable control means for supplemental braking purposes. These conventional retarder systems which are arranged to be used in conjunction with the transmission require control systems which have an extra pump for pumping transmission fluid to the retarder and a separate oil cooler for cooling the working fluid emanating from the retarder. This often results in a complex control system having to be "tailored" for each type of vehicle application.

An engine-mounted retarder of the type described in copending application U.S. Ser. No. 736,437, now Pat. No. 3,490,567, overcomes this disadvantage since it forms part of the engine's output and, therefore, may be used with a variety of transmissions without special adaptations for each type of transmission. In the copending application a retarder is provided having the rotor thereof attached directly to the engine's crankshaft or power output shaft. The rotor is preferably positioned between the crankshaft's rearmost support bearing and the engine's flywheel to provide a retarder assembly exhibiting a high degree of structural integrity and which is less prone than conventional retarders to cause damage to the engine and attendant components. The subject retarder is adapted to utilize the engine oil pump to supply braking fluid to the retarder. The problem which has arisen when utilizing the retarder so described is that when engine oil is used as the working fluid, the engine, when first started up, receives an inadequate supply of lubricant due to the fact that the retarder is being charged. This inadequacy of lubricant to the engine can, of course, result in serious damage to the moving parts thereof.

It is therefore an object of this invention to provide a retarder control system which utilizes lubricating oil utilized in the engine's lubrication system as the working fluid for the retarder.

It is a further object of this invention to provide a retarder control system which automatically directs engine oil to the engine during start-up and then, when sufficient oil pressure is achieved, directs oil to the retarder through an operator-controlled valve.

It is a still further object of this invention to provide a retarder control system which directs engine oil to the retarder and simultaneously meters sufficient oil to the engine to supply its needs.

It is a still further object of the retarder control system of this invention to insure that oil heated by the retarder is cooled before returning it to the engine.

It is a still further object of the retarder control system of this invention to provide a simple, compact control system unit which may be mounted directly on a vehicle engine and, using various parts of the normal engine configuration, be used with various transmissions, thus alleviating the necessity of "tailoring" the system to a particular type of engine used on a variety of vehicles.

These and other objects of this invention will become more readily apparent from the following description and accompanying drawings wherein:

FIG. 2 shows a cross-sectional illustration of an alternative embodiment of the priority valve of the retarder control system of this invention.

Figure 1:
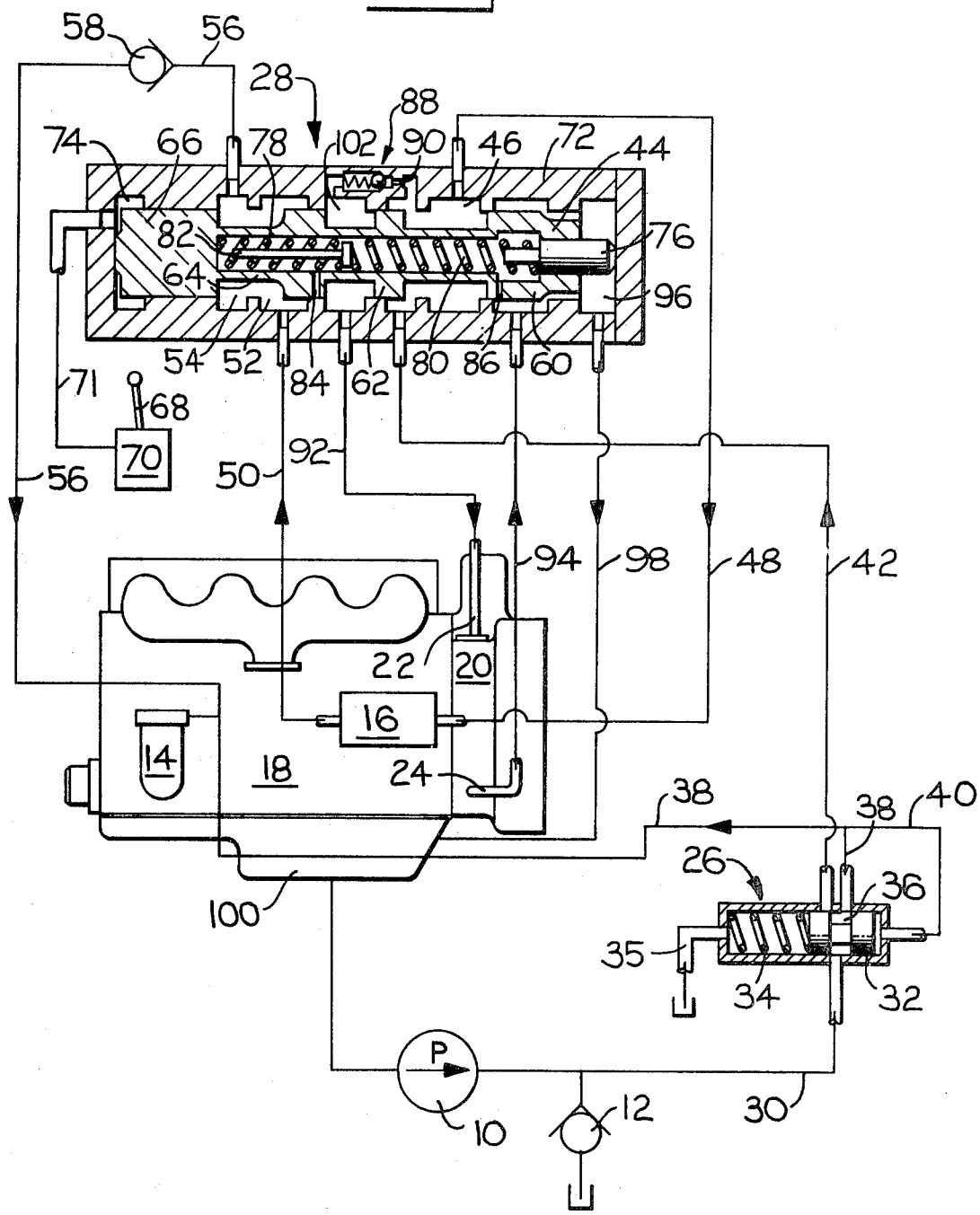
FIG. 1 shows a schematic-sectional illustration, partly in cross section, of the retarder control system of this invention in association with a conventional engine having a crankshaft mounted retarder.

Referring to FIG. 1, there is shown an engine-driven oil pump 10, pressure relief valve 12, oil filter 14, and heat exchanger 16, which are all part of the normal configuration of engine 18. Pump 10 is mounted on and driven by the engine. Mounted at the rear of engine 18 is a hydrodynamic retarder 20 having an inlet 22 and an outlet 24 with fluid flow direction indicated by arrows. The retarder control system comprises a first pressure responsive, priority valve generally shown at 26 and a second, control valve shown generally at 28. Lubricant is pumped from the engine by means of pump 10 through a conduit 30 which is in communication with valve 26. Valve 26 contains a spool 32 which is biased by a spring 34 to the position shown. A drain conduit 35 is provided at the spring end of the valve.

During engine starting periods, when oil pressure is low, lubricant is directed from the pump by way of conduit 30 around groove 36 in valve spool 32 and, by means of conduit 38, is directed to oil filter 14 and thence into the engine to accomplish its lubrication function. As engine oil pressure rises to normal, spool 32 compresses spring 34 due to the force acting on the right end of the spool which results from pressure communicated by conduit 40 which is, in turn, in communication with conduit 38. In this manner, spool 32 moves to the left and groove 36 brings conduits 30 and 42 into fluid communication. Conduits 38 and 42 defining a first and second outlet means, respectively, are so spaced in relation to the dimension of groove 36 that at some interim period during the movement of the spool, both conduits are in fluid communication with conduit 30 which defines an inlet means. Thus, as engine oil pressure rises gradually from zero at the start, lubricant is first channeled directly to the engine. At some interim period lubricant is directed both to the engine and to the retarder. At some later period the lubricant pressure achieves a sufficiently high value such that the direct channel to the engine is cut off, and all lubricant from the pump is channeled through conduit 42.

Oil thus flows around groove 36 from conduit 30 to conduit 42, the latter conduit being connected to the retarder control valve 28. Oil then flows through valve 28 by means of spool 44 with an annular groove 46 communicating with a conduit 48 and thence heat exchanger 16. Oil thus flows through the heat exchanger where it is cooled sufficiently to be utilized in the engine. Oil or lubricant flows from the heat exchanger and a conduit 50 to an annular groove 52 and an annular groove 54 which communicates with conduit 56 having a check valve 58 therein, and thence through oil filter 14 to engine 18. During starting of the engine, check valve 58 precludes flow of oil to control valve 28 in order to prevent heat exchange 16 from filling and thus depriving the engine of a sufficient amount of lubricant for proper operation.

Control valve 28 is arranged to be actuated by a handle 68 of air control valve 70 which meters air from an air pressure source (not shown) to conduit 71. Control valve 28 comprises a valve spool 44 slidably arranged in a housing 72. Air control valve 70 is arranged to control the air pressure in a chamber 74 at the left end of control valve 28. Valve spool 44 comprises lands 60 through 66 for selectively passing working fluid thereby, depending upon the position of the spool. A slug 76 is slidably arranged in the spool and abuts valve housing 72 under the biasing action of two compression springs 78 and 80. The two springs are arranged on both sides of a stop member 82 in such a manner that a dual spring rate is produced. Holes 84 and 86 are arranged in the spool to communicated fluid to the spring chamber from retarder inlet 22 and outlet 24, respectively. The spring loaded poppet valve 88 is arranged to cooperate with a restricted passage 90 for purposes hereinafter explained. If needed, a more complete explanation of the operation of valve 28, per se, may be had by referring to U.S. Pat. No. 3,386,540, assigned to the same assignee as this invention.

When retarding is required, control valve 28 is arranged to be actuated by air control valve 70 which controls the pressure in chamber 74. Upon actuation, spool 44 is moved to the right. Lands 60–66 are thus arranged to communicate fluid in line 42 with a conduit 92 for charging retarder 20 through inlet 22. A retarder discharge conduit 94 is connected to valve 28 and arranged to communicate with conduit 48 by lands 60 and 62. Fluid thus flows in conduit 48 to heat exchanger 16 where it is cooled and returned to valve 28 by means of conduit 50 and metered across land 66 and groove 54. The fluid is then directed through line 56 to the engine by way of filter 14.

To deactivate the retarder, air pressure is removed from spool 44 by actuation of handle 68 of air control valve 70. Springs 78 and 80 move spool 44 to the leftmost position as shown in FIG. 1. Spool 44 thus directs fluid to flow in the previously described manner. Because retarder 20 acts as a pump, oil remaining in it, after the retarder has been removed from the circuit, is pumped through conduit 94, across lands 60 to an annular groove 96 and thence to a return conduit 98 that leads to the engine pump 100. To insure adequate lubrication of the retarder seals, a poppet valve 88, communicating between groove 46 and groove 102, permits a relatively small amount of oil to be delivered to the retarder for cooling and lubrication when the retarder is not being used.

Referring now to FIG. 2, there is shown an alternative embodiment of the priority valve 26 which valve is designated generally 26'. Priority valve 26' may be bodily substituted for valve 26 in the previously described retarder control system as shown in FIG. 1. Priority valve 26' functions in a manner somewhat different than priority valve 26, as will be hereinafter described.

Valve 28' consists of a body 29 having an inlet 30' and outlets 38' and 42'; a generally cylindrical spool 32' having an annular groove 33 and four longitudinal metering slots 37; a bore 39; a spring 34' contained between plate 41, having drain 35' therein, and spool 32', the spring urging the spool rightwardly against plate 43; and O-ring seals 45 and 47 sealing plates 41 and 43, respectively. Fastening means (not shown) serve to retain the plates on the body.

When bodily substituting alternative priority valve 26' for valve 26 in the retarder control circuit shown in FIG. 1, fluid connection would be accomplished between inlet 30' and conduit 30, drain 35' and conduit 35, inlet 38' and conduit 38, and inlet 42' and conduit 42. Conduit 40 shown in FIG. 1 is not needed with priority valve 26' and would therefore be eliminated.

During engine starting periods when oil pressure is low, lubricant is directed from pump 10 through conduit 30 to inlet 30' of valve 26'. Oil then flows across groove 33 and through metering slots 37 in spool 32' and, from outlet 38' by means of conduit 38, is directed to oil filter 14 and thence into the engine to accomplish its lubrication function. As the oil pressure in outlet 38' rises to normal, pressure acting on frustoconical face 37a causes spool 32' to be moved leftwardly against the force of spring 34' until outlet 42' is brought into fluid communication with inlet 30'. Oil thus flows through the fluid circuit defined by conduit 42, control valve 28, conduit 48, heat exchanger 16, and conduit 50. When this circuit is charged, oil exits through conduit 56 to the oil filter 14 and thence to the engine. When fluid pressure in the retarder circuit reaches a normal, as established by relief valve 12, pressure is communicated to spool 32' through outlet 38' which causes the spool to move fully to the left so all oil flow takes place by way of the aforementioned fluid circuit prior to entering the engine.

When control valve 28 is actuated by means of handle 68 the large volume of retarder 20 begins to fill with lubricant. This causes a pressure drop in the circuit which is communicated to outlet 38'. The low-presure condition acting on face 37a allows spool 32' to be moved rightwardly by the action of spring 34' which reduces the flow through outlet 42' slightly and at the same time allows a minimum flow through metering slots 37 and outlet 38' to the engine. The lubricant flow from pump 10 is thus divided with a minimum flow being channeled directly to the engine sufficient for its lubrication needs while the balance of the flow is channeled to the retarder for vehicle braking. When retarder 20 is filled or no longer needed and control valve 28 deactivates it, the pressure in the circuit rises to normal and spool 32' moves to the left compressing spring 34' under the force of the pressure at outlet 38'. All flow through outlet 38' is thus shut off and all flow is directed through outlet 42'.

It may be noted that oil and lubricant are used interchangeably in this disclosure. While oil, in the sense of a petroleum product, is normally used in internal combustion engines utilizing the device of this invention, any sort of fluid lubricant may be used. Thus, it is not the intention to provide an invention utilizable only with oil but rather with a broad class of fluid lubricants.

In addition, while the above-described invention is particularly adapted for use with an engine-mounted retarder, it is not restricted to such use and, in fact, may be advantageously used with retarders which are not engine mounted, e.g., transmission-mounted retarders.

It is understood that the foregoing description is merely illustrative of preferred embodiments of the invention and that the scope of the invention is not to be limited thereto, but is to be determined by the scope of the appended claims.

What is claimed is:

1. In an internal combustion engine having a pressurized lubricating system, a control system comprising a pressurized lubricating fluid source and a hydrodynamic retarder operatively associated with said engine for selective braking purposes, retarder control valve means operatively connected to said fluid source and said retarder for selectively activating said retarder with said lubricating fluid, and priority valve means operatively connected between said fluid source and said retarder control valve means and further operatively connected to said engine for automatically communicating lubricating fluid only to said engine and not to said retarder when the pressure of the lubricating fluid in said engine falls below a predetermined level for automatically communicating lubricating fluid under pressure to the lubricating system of said engine through said retarder control valve means when said pressure exceeds said predetermined level whereby sufficient lubricating fluid pressure to satisfy the requirements of the engine is insured.

2. The invention of claim 1 wherein the priority valve means has pressure dependent means such that said valve means functions to direct lubricating fluid directly to the engine when lubricating fluid pressure is low such as during engine starting.

3. The invention of claim 2 further including means for actuating the control valve means such that the lubricating fluid may be directed either through or around the retarder.

4. The invention of claim 3 wherein the priority valve means comprises a priority valve having a spool therein and spring means biasing said spool to a first position wherein the fluid source is in fluid communication with the engine and out of fluid communication with the control valve means.

5. The invention of claim 4 wherein means are provided for communicating engine lubricating fluid pressure to the end of the spool opposite the spring means such that when engine operating pressure is achieved said spool may be shifted by said pressure to a position wherein the control valve means is in fluid communication with the fluid source by way of said priority valve means.

6. The invention of claim 5 wherein the means for communicating engine lubricating fluid pressure to the spool end is a conduit means connected to the means adapted to connect the priority valve means to the engine.

7. The invention of claim 5 wherein the control valve means comprises a control valve having a spool therein and spring means biasing said spool to a first position wherein the priority valve is in fluid communication with the engine by way of said control valve means and upon valve actuation the spool is shifted wherein the retarder also is brought into the fluid circuit between the priority valve and the engine.

8. The invention of claim 7 wherein the means for actuating the control valve comprises a source of air pressure, an air control valve, and conduit means connecting said pressure source to said control valve by way of said air control valve.

9. The invention of claim 7 further including check valve means in the fluid circuit between the control valve and the engine to prevent return flow of lubricant from the engine to said control valve.

10. In an internal combustion engine having a lubricant pump, lubricant filter, a heat exchanger and a retarder, the improvement comprising a retarder control system comprising priority valve means for directing lubricant from the lubricant pump, said means being responsive to lubricant pressure whereby sufficient lubricant is directed to the engine during conditions below operating pressure in order that the engine has sufficient lubricant for proper operation at all times, and to control valve means after operating pressure is achieved, said control valve means functioning to direct lubricant from the valve means through a heat exchanger where heat is given off, thence through the lubricant filter and into the engine during one mode of operation and, additionally, through the retarder during a second mode of operation, thus to provide selective retarder operation for braking.

11. The invention as claimed in claim 10 wherein means are provided whereby the retarder is directly coupled to the engine output.

* * * * *